UNITED STATES PATENT OFFICE.

WILLIAM H. KELLER, OF LOCK HAVEN, PENNSYLVANIA.

FIRE-PROOF-PAINT COMPOUND.

SPECIFICATION forming part of Letters Patent No. 343,906, dated June 15, 1886.

Application filed December 19, 1885. Serial No. 186,139. (Specimens.)

*To all whom it may concern:*

Be it known that I, WILLIAM HENRY KELLER, a citizen of the United States, residing at Lock Haven, in the county of Clinton and State of Pennsylvania, have invented certain new and useful Improvements in Fire-Proof Paint; and I do hereby declare the following to be a sufficiently full, clear, and exact description thereof as to enable others skilled in the art to make and use the said invention.

This invention relates to paints for protecting combustible materials exposed to weather and fire, and has for its object the furnishing of a cheap and durable compound readily applied, and which, when dried, is incombustible, and of such tenacity and elasticity as to avoid cracking from either its own contraction or expansion or that of the wood-work or metal to which it is applied.

To effect these desiderata the nature of the said invention may be concisely stated to consist of a compound, hereinafter fully described, consisting largely of coal-tar, and in which, as an essential ingredient, mineral wool is incorporated.

I will now proceed to fully and particularly describe the mode of making and using this compound.

The ingredients and proportions are as follows: From ten to twenty pounds of mineral wool in a finely comminuted or pulverized state; five pounds of vulcanized india-rubber; one gallon of Japan drying varnish; thirty-five gallons of coal-tar; ten pounds of litharge; two quarts of sulphuric acid; two gallons of spirits of turpentine; ten pounds of red oxide of iron; five pounds of yellow ocher; five pounds of Venetian red.

The vulcanized india-rubber is dissolved in a portion of the coal-tar with naphtha or benzine sufficient to reduce it to a fluid state. The litharge is then stirred into the benzine or naphtha and coal-tar containing the india-rubber. The bulk of the coal-tar is placed in a cauldron. The sulphuric acid is then added and well stirred for about five minutes. The solution containing the india-rubber is then added, and the contents of the cauldron stirred vigorously for five minutes, or thereabouts; the other recited solid ingredients are then added and stirred in until uniformly and thoroughly mixed; and, finally, the Japan drier and spirits of turpentine are added and stirred in.

Heat may be applied to the cauldron in the mixing operation, and facilitates the stirring, but is not essential.

The paint is applied either cold or warm to dry surfaces of wood or metal, and hardens upon exposure to the atmosphere, retaining a degree of toughness and elasticity which permits the paint to adapt itself to changes of dimension by expansion and contraction of the material upon which it is used consequent upon changes of temperature or hygrometrical conditions, so that it remains continuously an elastic water-proof protecting covering of such slow heat-conducting properties as to protect wood-work from ignition from the burning of contiguous substances.

Having described my invention and the mode of making and using the same, what I claim is—

A fire-proof-paint compound consisting of vulcanized india-rubber, Japan drying varnish, coal-tar, litharge, sulphuric acid, spirits of turpentine, red oxide of iron, yellow ocher, Venetian red, and artificial mineral wool, in the proportions substantially as specified.

W. H. KELLER.

Witnesses:
J. DANIEL EBY,
ALEX. H. SIEGEL.